(12) United States Patent
Tai

(10) Patent No.: US 8,984,860 B2
(45) Date of Patent: Mar. 24, 2015

(54) DIESEL ENGINE AND EXHAUST AFTERTREATMENT SYSTEM AND METHOD OF TREATING EXHAUST GASES FROM A DIESEL ENGINE

(75) Inventor: Chun Tai, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 51 days.

(21) Appl. No.: 13/807,236

(22) PCT Filed: Jul. 2, 2010

(86) PCT No.: PCT/US2010/040901
§ 371 (c)(1),
(2), (4) Date: Dec. 27, 2012

(87) PCT Pub. No.: WO2012/002973
PCT Pub. Date: Jan. 5, 2012

(65) Prior Publication Data
US 2013/0098001 A1    Apr. 25, 2013

(51) Int. Cl.
*F01N 3/00*    (2006.01)
*F01N 3/021*   (2006.01)
(Continued)

(52) U.S. Cl.
CPC .............. *F01N 3/021* (2013.01); *F01N 3/0231* (2013.01); *F01N 3/0253* (2013.01); *F01N 3/106* (2013.01);
(Continued)

(58) Field of Classification Search
CPC ..... F01N 3/0253; F01N 3/035; F01N 3/0871; F01N 3/00; F01N 3/023; F01N 13/0097; F01N 9/00

USPC ............ 60/274, 286, 280, 295, 297, 301, 303
See application file for complete search history.

(56) References Cited

U.S. PATENT DOCUMENTS 7,185,486 B2    3/2007    Bluhm et al.
7,275,365 B2    10/2007   Zhan et al.
(Continued)

FOREIGN PATENT DOCUMENTS

CN       1971005 A        5/2007
DE    102006007122 A1 *   8/2007
(Continued)

OTHER PUBLICATIONS

DE 102006007122 A1 English Translation, Braun et al., Aug. 23, 2007, Whole Document.*

(Continued)

*Primary Examiner* — Thomas Denion
*Assistant Examiner* — Kelsey Stanek
(74) *Attorney, Agent, or Firm* — WRB-IP LLP

(57) ABSTRACT

In a diesel engine and exhaust aftertreatment system, a controller is arranged to control operation of the engine to obtain a first set of exhaust characteristics and to control a fuel injector to inject fuel upstream of a DPF at a first rate of injection until at least one condition is attained, and, after the at least one condition is attained, to control the fuel injector so that a rate of fuel injection is reduced and to contra! operation of the engine to obtain a second set of exhaust characteristics so that regeneration of the DPF occurs. At least one characteristic of the first and second sets of characteristics beina, different. A method for treating, diesei engine exhaust is also disclosed.

18 Claims, 2 Drawing Sheets

(51) Int. Cl.
  *F01N 3/023* (2006.01)
  *F01N 3/025* (2006.01)
  *F01N 3/10* (2006.01)
  *F01N 9/00* (2006.01)
  *F02D 41/02* (2006.01)
  *F02D 41/14* (2006.01)
  *F01N 13/00* (2010.01)
  *F01N 3/20* (2006.01)

(52) U.S. Cl.
  CPC ............... *F01N 3/2066* (2013.01); *F01N 9/002* (2013.01); *F01N 2560/023* (2013.01); *F01N 2560/06* (2013.01); *F01N 2610/146* (2013.01); *F01N 2900/1402* (2013.01); *F01N 2900/1404* (2013.01); *F02D 41/024* (2013.01); *F02D 41/029* (2013.01); *F02D 41/1446* (2013.01); *Y02T 10/26* (2013.01); *Y02T 10/47* (2013.01); *F01N 13/009* (2013.01)
  USPC .................... 60/274; 60/286; 60/297; 60/311

(56) References Cited

U.S. PATENT DOCUMENTS

| | | |
|---|---|---|
| 7,337,607 B2 | 3/2008 | Hou et al. |
| 2003/0230075 A1 | 12/2003 | Saito et al. |
| 2004/0013579 A1 | 1/2004 | Schaller |
| 2004/0244366 A1 | 12/2004 | Hiranuma et al. |
| 2008/0016849 A1* | 1/2008 | McCarthy et al. .............. 60/286 |
| 2009/0019842 A1 | 1/2009 | Suzuki et al. |
| 2010/0257847 A1 | 10/2010 | Nishioka et al. |

FOREIGN PATENT DOCUMENTS

| | | | |
|---|---|---|---|
| EP | 1770254 A1 * | 4/2007 | |
| JP | 2003214144 A | 7/2003 | |
| JP | 2005061363 A | 3/2005 | |
| JP | 2009275561 A | 11/2009 | |
| JP | 2009293431 A | 12/2009 | |
| WO | 2004022935 A1 | 3/2004 | |
| WO | 2009100412 A1 | 8/2009 | |
| WO | 2009100413 A1 | 8/2009 | |

OTHER PUBLICATIONS

International Search Report (Sep. 1, 2010) for corresponding International Application PCT/S2010/040901.
International Preliminary Report on Patentability (Dec. 24, 2012) for corresponding International Application PCT/US2010/040901.
Extended European Search Report (Dec. 13, 2013) for corresponding European Application 10854233.3.
Office action dated Nov. 25, 2014 for corresponding Japan Application 2013-518357 translated.
CN Office action dated Sep. 30, 2014 for corresponding China Application 201080067888.0 translated.
Office action dated Jul. 8, 2014 for corresponding Japan Application 2013-518357 translated.

* cited by examiner

DIESEL ENGINE AND EXHAUST AFTERTREATMENT SYSTEM AND METHOD OF TREATING EXHAUST GASES FROM A DIESEL ENGINE

BACKGROUND AND SUMMARY

The present invention relates generally to diesel engines with exhaust aftertreatment systems (EATS) and methods of treating exhaust gases from a diesel engine and, more particularly, to such engines and EATS and methods wherein fuel injection and engine exhaust characteristics are varied during regeneration.

Commonly assigned International Application Publication WO2009/100412 and commonly-assigned International Application Publication WO2009/100413, both of which are expressly incorporated by reference, disclose regeneration of diesel particulate filters (DPF) in EATS via NO2 regeneration. So-called "active" NO2 regeneration at temperatures usually in the range of 450° C.-550° C., which are above conventional passive NO2 regeneration temperature ranges and below conventional active O2 regeneration temperature ranges, produces encouraging results when compared to either conventional passive NO2 or conventional active O2 regeneration. However, under many conditions, particularly when the engine and EATS is used in vehicular, over-the-road transient operations, fuel injected via a so-called seventh injector to heat a DPF to temperatures desired for active NO2 regeneration can cause hydrocarbon slip through a diesel oxidation catalyst (DOC) upstream of the DPF, which can inhibit NO2 recycling that is desirable for the active NO2 regeneration.

It is desirable to provide a method of treating exhaust gases and an engine and exhaust aftertreatment system that permits DPF regeneration, particular performing active NO2 regeneration, under conditions that can reduce the risk of hydrocarbon slip past a DOC or a DPF. It is also desirable to provide a method of treating exhaust gases and an engine and exhaust aftertreatment system that permits performing effective DPF regeneration, particular performing active NO2 regeneration, under conditions that reduce risk of runaway regeneration or other thermal damage to a DPF or an SCR.

According to an aspect of the present invention, a method of treating exhaust gases from a diesel engine comprises operating the engine and passing exhaust gases through a diesel particulate filter (DPF), operating the engine to obtain a first set of exhaust characteristics and injecting fuel upstream of the DPF at a first rate of injection until at least one condition is attained, and after the at least one condition is attained, reducing a rate of fuel injection and operating the engine to obtain a second set of exhaust characteristics so that regeneration of the DPF occurs, at least one characteristic of the first and second sets of characteristics being different.

According to another aspect of the present invention, a diesel engine and exhaust aftertreatment system comprises a diesel engine adapted to be operated to attain at least two different sets of exhaust characteristics, a diesel particulate filter (DPF) downstream of the engine, a fuel injector downstream of the engine and upstream of the DPF, and a controller arranged to control operation of the engine to obtain a first set of exhaust characteristics and to control the fuel injector to inject fuel upstream of the DPF at a first rate of injection until at least one condition is attained, and, after the at least one condition is attained, to control the fuel injector so that a rate of fuel injection is reduced and to control operation of the engine to obtain a second set of exhaust characteristics so that regeneration of the DPF occurs, at least one characteristic of the first and second sets of characteristics being different.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
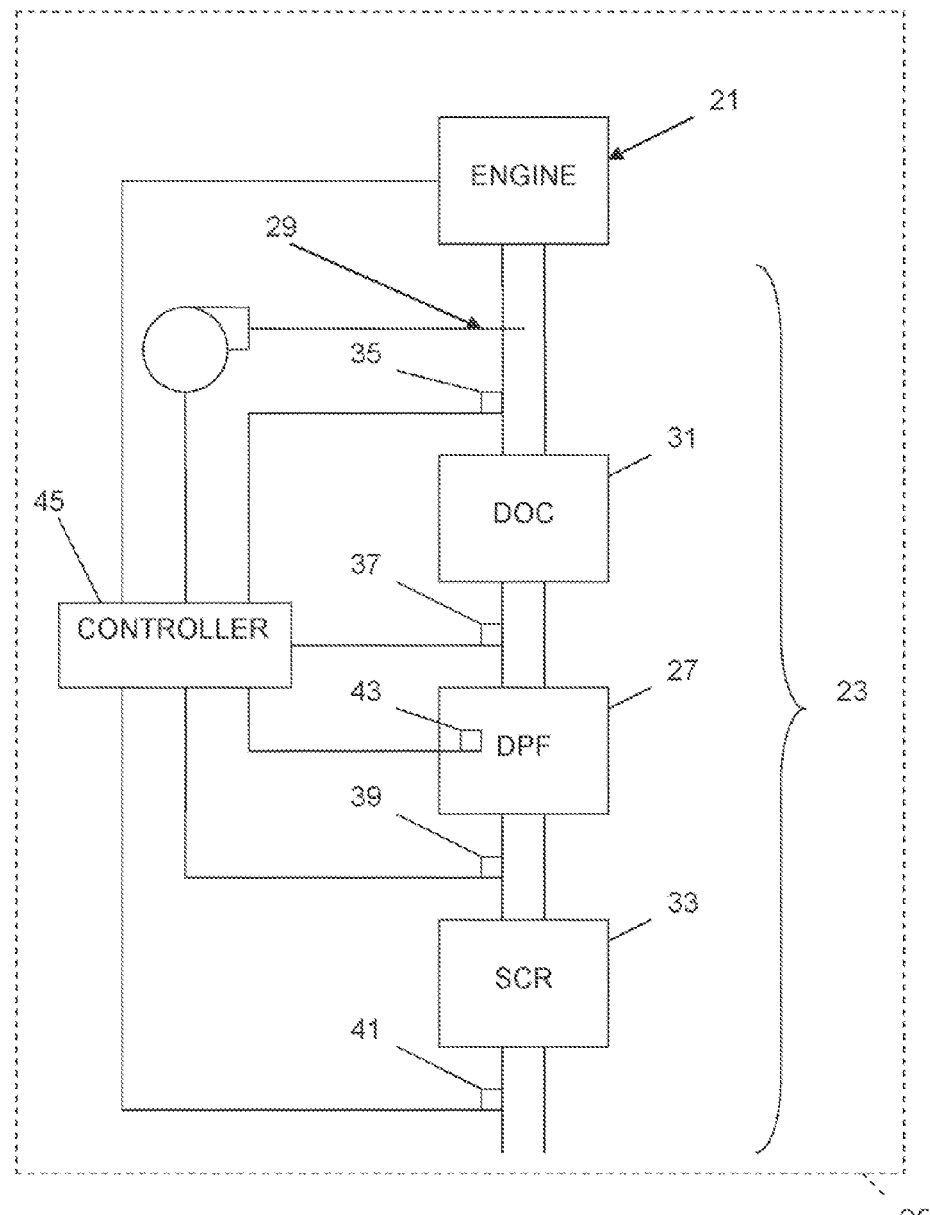
FIG. 1 is a schematic view of a vehicle including a diesel engine and exhaust aftertreatment system according to an aspect of the present invention.

FIG. 1 shows a diesel engine 21 and exhaust aftertreatment system 23 (EATS) according to an aspect of the present invention that might be used in a variety of applications, particularly applications wherein the diesel engine is used to drive a vehicle 25 (shown schematically in phantom). While the present invention is considered to be particularly useful in vehicles such as trucks, it can be used in other types of vehicles, as well as in non-vehicular applications.

The diesel engine 21 is adapted to be operated to attain at least two different sets of exhaust characteristics. For example, by adjusting engine operating characteristics such as the timing of fuel injection, it is possible to change the NOx levels in and/or the temperature of the engine exhaust. It is also possible to adjust engine operating characteristics to obtain different exhaust mass flow rates, such as by changing engine speed or load, or closing a variable geometry turbocharger geometry. A variety of techniques for altering engine exhaust characteristics are well known and the present invention is not considered to be limited to use of any particular techniques.

The EATS 23 includes a diesel particulate filter 27 (DPF) downstream of the engine 21. The EATS 23 further includes a fuel injector 29 downstream of the engine 21 and upstream of the DPF 27. A diesel oxidation catalyst 31 (DOC) can be provided upstream of the DPF 27, and a selective catalytic reduction (SCR) catalyst 33 can be provided downstream of the DPF. Sensors can be located at a variety of points in the EATS 23 for monitoring a variety of exhaust characteristics, including exhaust mass flow rate, temperature, NOx levels, and hydrocarbon levels at one or more of the various points in the EATS. Sensors for monitoring one or more exhaust characteristics including exhaust mass flow rate, temperature, NOx levels, and hydrocarbon levels ordinarily include at least one sensor 35 disposed between the engine 21 and the DOC 31 (if provided), another sensor 37 between the DOC and the DPF 27, another sensor 39 between the DPF and the SCR catalyst 33, and another sensor 41 downstream of the SCR catalyst. A sensor 43 may also be provided in the DPF.

The EATS 23 can comprise the features of the apparatus and be operated in accordance with the method for regeneration of the DPF by active NO2-based regeneration with enhanced effective NO2 supply as disclosed in commonly-assigned International Application Publication WO2009/100412 and/or comprise the features of the apparatus and be operated in accordance with the method for regeneration of a DPF using recirculated NOx as disclosed in commonly-assigned International Application Publication WO2009/100413, both of which are expressly incorporated by reference.

A controller 45, which may be any suitable form of electronic control such as a computer, an ECU, or the like, is arranged to control operation of the engine 21 to obtain a first set of exhaust characteristics and to control the fuel injector 29 to inject fuel upstream of the DPF 27 at a first rate of injection until at least one condition is attained, and, after the at least one condition is attained, to control the fuel injector so that a rate of fuel injection is reduced and to control operation of the engine to obtain a second set of exhaust characteristics so that regeneration of the DPF occurs, at least one characteristic of the first and second sets of characteristics being different. When fuel injection is reduced, it is reduced to a level below the first rate of injection and greater than or equal to zero.

The first set of exhaust characteristics may differ from the second set of exhaust characteristics with respect to a variety of characteristics, including one or more of mass flow rate, exhaust temperature, and NOx levels. Ordinarily, the first set of exhaust characteristics will include one or more of a higher mass flow rate and a lower NOx level than the second set of exhaust characteristics. During normal engine operation, NOx levels are typically around 400 ppm however, during an active NO2 regeneration, NOx levels are often around 1000 ppm. During normal engine operation, exhaust temperatures may be around 300° C. while, when high exhaust temperatures are produced, temperatures may be around 400° C. During normal operation, exhaust mass flow rates for a 13 liter engine are typically in a range of 0-0.5 kg/s. If exhaust mass flow during regeneration is less than normal mass flow rates, cooling of the DPF can be slowed down, which can aid in the effectiveness of the regeneration.

The at least one condition can include one or more of heating of the DPF 27 to a temperature at or above a predetermined heating temperature at which active NO2 regeneration occurs but below a temperature at which runaway regeneration of the DPF occurs or there is a risk of damage to the SCR catalyst 33. For example, the DPF 27 might be heated to 550° C., which is below or near the bottom range of the temperatures at which active O2 regeneration tends to occur but within the range that active NO2 regeneration tends to occur. The particular temperature to which the DPF 27 is heated may, in addition, be a function of additional factors such as soot loading in the DPF, where a higher soot loading might tend to call for a lower target temperature. The at least one condition may also or alternatively include sensing that an amount of hydrocarbon slip through the DOC 31 upstream of the DPF exceeds a predetermined level at which operation of the DPF or the SCR catalyst 33 might be compromised or damage to the DPF or SCR catalyst might occur. A typical maximum acceptable hydrocarbon slip through a DPF upstream of an SCR is currently about 30 ppm. The at least one condition may also or alternatively include sensing that a temperature upstream or downstream from the DPF is at or above a predetermined temperature, or that, based on modeling, a temperature of the DPF or upstream or downstream of the DPF is at or above a predetermined temperature, or that a predetermined amount of time during which the fuel injector 29 has been injecting fuel at the first rate and the engine 21 has been operated to obtain the first exhaust characteristics has elapsed.

Ordinarily, the controller 45 is arranged so that, after the at least one condition is attained, the controller controls the fuel injector so that a rate of fuel injection is reduced and controls operation of the engine to obtain a second set of exhaust characteristics so that enhanced NO2 regeneration of the DPF occurs. As hydrocarbon may behave as an inhibitor for soot regeneration or soot oxidation reaction with NO2, the rate of fuel injection through the seventh injector is reduced to the level such that the hydrocarbon slip level through DOC is kept within an acceptable level to ensure a sufficient rate of soot regeneration. A typical maximum acceptable hydrocarbon slip through a DOC upstream of a DPF is currently about 30 ppm. Regeneration may, but need not, occur when the controller 45 controls operation of the engine 21 to obtain the first set of exhaust characteristics and controls the fuel injector 29 to inject fuel upstream of the DPF 27 at a first rate of injection until at least one condition is attained, and/or during other periods of operation.

The controller 45 can also be arranged to control the fuel injector 29 so that a rate of fuel injection is reduced and to control operation of the engine 21 to obtain the second set of exhaust characteristics until at least one second condition is attained. The at least one second condition can include one or more of cooling of the DPF 27 (or a point upstream or downstream of the DPF) to below a predetermined regeneration temperature, or a lapse of a predetermined amount of time. The at least one second condition may include a DPF 27 temperature (or a temperature downstream of the DPF) falling below a predetermined regeneration temperature based on modeling instead of upon actual measurements of DPF temperature. It will be appreciated that references to DPF temperature may mean temperature at an inlet of the DPF or upstream of the DPF, rather than temperature measured inside the DPF itself.

Figure 2:
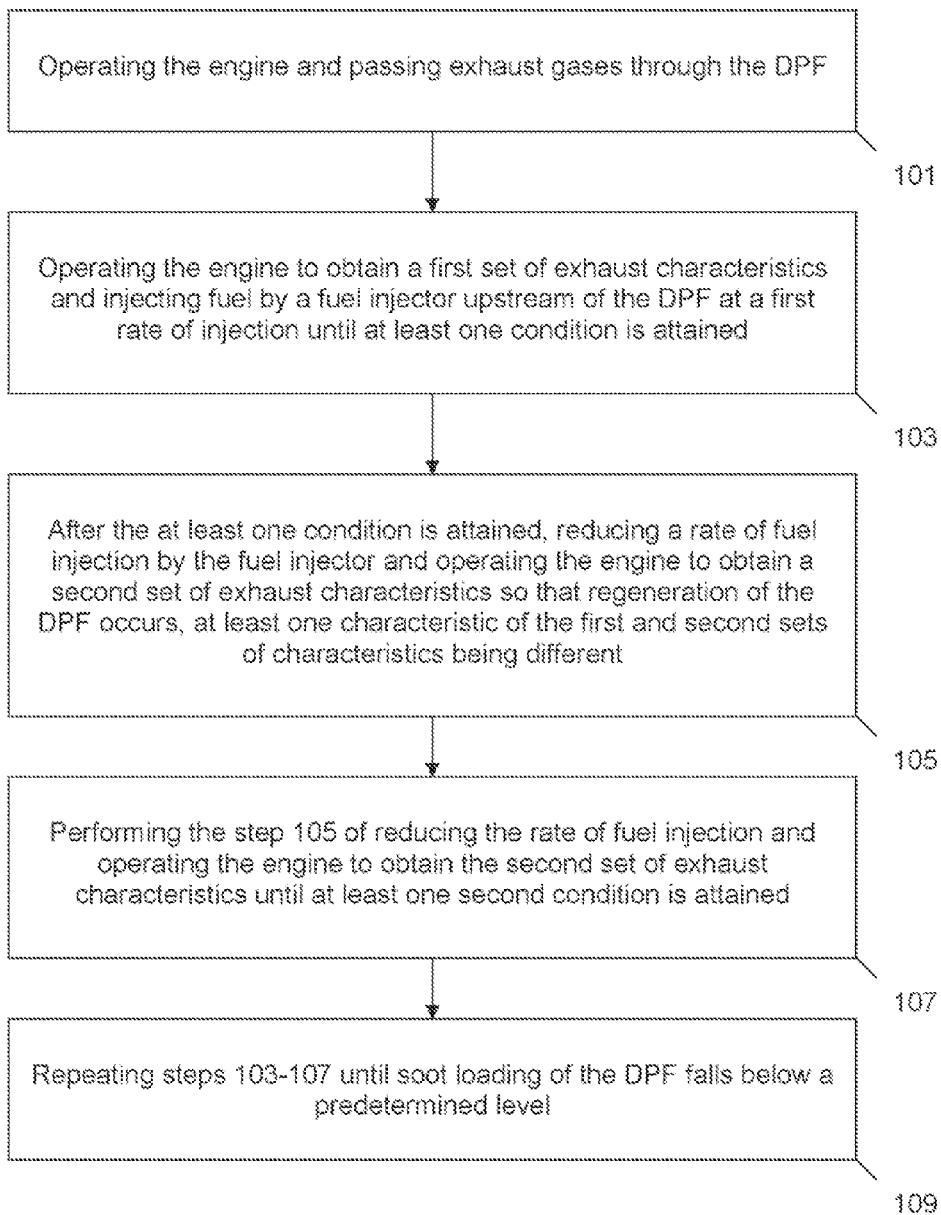
FIG. 2 is a flow chart illustrating steps in a method of treating exhaust gases from a diesel engine according to an aspect of the present invention.

A method of treating exhaust gases from a diesel engine 21 is illustrated in FIG. 2 and comprises a step 101 of operating the engine 21 and passing exhaust gases through the DPF 27. In a further step 103, the engine 21 is operated to obtain a first set of exhaust characteristics and fuel is injected by a fuel injector 29 upstream of the DPF 27 at a first rate of injection until at least one condition is attained. Step 103 can include controlling a rate of temperature rise of the DPF 27 during operation of the engine 21 to obtain the first set of exhaust characteristics and injection of fuel upstream of the DPF at the first rate of injection. In this way, thermal stress on the DPF 27, which might cause cracks and/or failure of the DPF, can be minimized. A typical temperature rise rate limit might be, for example, 3° C./second.

In a further step 105, after the at least one condition is attained, a rate of fuel injection by the fuel injector 29 is reduced and the engine 21 is operated to obtain a second set of exhaust characteristics so that regeneration of the DPF 27 occurs, at least one characteristic of the first and second sets of characteristics being different.

In a further step 107, the step 105 of reducing the rate of fuel injection and operating the engine 21 to obtain the second set of exhaust characteristics can be performed until at least one second condition is attained. After the second condition is attained, the step 103 can be repeated wherein the engine 21 can be operated to obtain the first set of exhaust characteristics and fuel can be injected upstream of the DPF 27 at the first rate of injection until the at least one condition is attained. In a further step 109, the steps of operating the engine 21 to obtain the first set of exhaust characteristics and injecting fuel upstream of the DPF 27 at a first rate of injection until the at least one condition is attained (step 103) and, after the at least one condition is attained, reducing the rate of fuel injection and operating the engine to obtain the second set of exhaust characteristics so that enhanced regeneration of the DPF occurs is performed until at least one second condition is attained (step 105) can be repeated until soot loading of the DPF falls below a predetermined level.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method of treating exhaust gases from a diesel engine, comprising:
   operating the engine and passing exhaust gases through a diesel particulate filter (DPF);
   operating the engine to obtain a first set of exhaust characteristics and injecting fuel upstream of the DPF at a first rate of injection so that active NO2-based regeneration of the DPF occurs until at least one condition is attained; and
   after the at least one condition is attained, reducing a rate of fuel injection and operating the engine to obtain a second set of exhaust characteristics so that NO2-based regeneration of the DPF occurs, at least one characteristic of the first and second sets of characteristics being different.

2. The method as set forth in claim 1, wherein the first set of exhaust characteristics includes a higher exhaust mass flow rate than the second set of exhaust characteristics.

3. The method as set forth in any of claims 1-2, wherein the second set of exhaust characteristics includes higher NOx than the first set of exhaust characteristics.

4. The method as set forth in any of claims 1-2, wherein the at least one condition includes heating of the DPF to a temperature above a predetermined heating temperature.

5. The method as set forth in any of claims 1-2, wherein the at least one condition includes an amount of hydrocarbon slip through a diesel oxidation catalyst upstream of the DPF exceeding a predetermined level.

6. The method as set forth in any of claims 1-2, wherein the step of reducing the rate of fuel injection and operating the engine to obtain the second set of exhaust characteristics is performed until at least one second condition is attained.

7. The method as set forth in claim 6, wherein the at least one second condition includes cooling of the DPF to below a predetermined regeneration temperature.

8. The method as set forth in claim 6, wherein the at least one second condition includes a modeled DPF temperature falling below a predetermined regeneration temperature.

9. The method as set forth in claim 6, wherein the at least one second condition includes a lapse of a predetermined time.

10. The method as set forth in claim 6, comprising, after the second condition is attained, operating the engine to obtain the first set of exhaust characteristics and injecting fuel upstream of the DPF at the first rate of injection until the at least one condition is attained.

11. The method as set forth in claim 10, comprising repeating the steps of operating the engine to obtain the first set of exhaust characteristics and injecting fuel upstream of the DPF at the first rate of injection until the at least one condition is attained and, after the at least one condition is attained, reducing the rate of fuel injection and operating the engine to obtain the second set of exhaust characteristics until the at the least one second condition is attained until soot loading of the DPF falls below a predetermined level.

12. The method as set forth in any of claims 1-2, comprising controlling a rate of temperature rise of the DPF during operation of the engine to obtain the first set of exhaust characteristics and injection of fuel upstream of the DPF at the first rate of injection.

13. The method as set forth in any of claims 1-2, wherein, after the at least one condition is attained, the rate of fuel injection is reduced and the engine is operated to obtain the second set of exhaust characteristics so that active NO2-based regeneration of the DPF occurs.

14. A diesel engine and exhaust aftertreatment system arranged to perform the method as set forth in any of claims 1-2.

15. A diesel engine and exhaust aftertreatment system, comprising:
   a diesel engine adapted to be operated to attain at least two different sets of exhaust characteristics;
   a diesel particulate filter (DPF) downstream of the engine;
   a fuel injector downstream of the engine and upstream of the DPF; and
   a controller arranged to control operation of the engine to obtain a first set of exhaust characteristics and to control the fuel injector to inject fuel upstream of the DPF at a first rate of injection so that active NO2-based regeneration of the DPF occurs until at least one condition is attained, and, after the at least one condition is attained, to control the fuel injector so that a rate of fuel injection is reduced and to control operation of the engine to obtain a second set of exhaust characteristics so that NO2-based regeneration of the DPF occurs, at least one characteristic of the first and second sets of characteristics being different.

16. The diesel engine and exhaust aftertreatment system as set forth in claim 15, wherein the controller is arranged to control the fuel injector so that a rate of fuel injection is reduced and to control operation of the engine to obtain the second set of exhaust characteristics until at least one second condition is attained.

17. The diesel engine and exhaust aftertreatment system as set forth in claim 15, wherein, after the at least one condition is attained, the controller is arranged to control the fuel injector so that a rate of fuel injection is reduced and to control operation of the engine to obtain a second set of exhaust characteristics so that active NO2-based regeneration of the DPF occurs.

18. A vehicle comprising the diesel engine and exhaust aftertreatment system as set forth in any of claims 15-17.

* * * * *